United States Patent [19]

Wright

[11] Patent Number: 4,999,670
[45] Date of Patent: Mar. 12, 1991

[54] PRINTER WITH PRINT MEDIA SUPPORT SYSTEM

[75] Inventor: Ronald F. Wright, Corvallis, Oreg.

[73] Assignee: CH₂M Hill, Inc., Corvallis, Oreg.

[21] Appl. No.: 355,172

[22] Filed: May 19, 1989

[51] Int. Cl.⁵ .............................................. G03B 27/20
[52] U.S. Cl. ................................................... 355/91
[58] Field of Search .................. 355/75, 67, 83, 91, 355/120, 100, 76, 131, 113; 428/34; 52/630, 793

[56] References Cited

U.S. PATENT DOCUMENTS

| | | | |
|---|---|---|---|
| 4,157,222 | 6/1979 | Ishihara | 355/75 |
| 4,526,463 | 7/1985 | Hickey et al. | 355/83 |
| 4,575,236 | 3/1986 | Lemmey | 355/120 X |
| 4,707,124 | 11/1987 | Hickey et al. | 355/83 |

Primary Examiner—L. T. Hix
Assistant Examiner—D. Rutledge
Attorney, Agent, or Firm—Klarquist, Sparkman, Campbell, Leigh & Whinston

[57] ABSTRACT

A plate for supporting one or more sheets of originals to be copied and a sheet of sensitized media is supported so as to minimize sag in one direction across the plate. The plate may be inclined with the top and bottom edges of the plate entirely supported or only supported at location(s) spaced inwardly from the edge of the plate. When a cover, such as a flexible curtain, is mechanically pressed against the plate, as by a roller, air gaps between the originals and sensitized media are minimized due to this plate support system. This improves the speed at which high quality prints can be obtained.

20 Claims, 7 Drawing Sheets

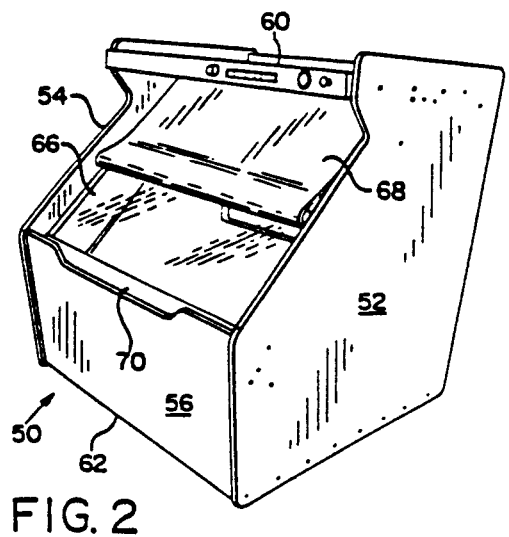
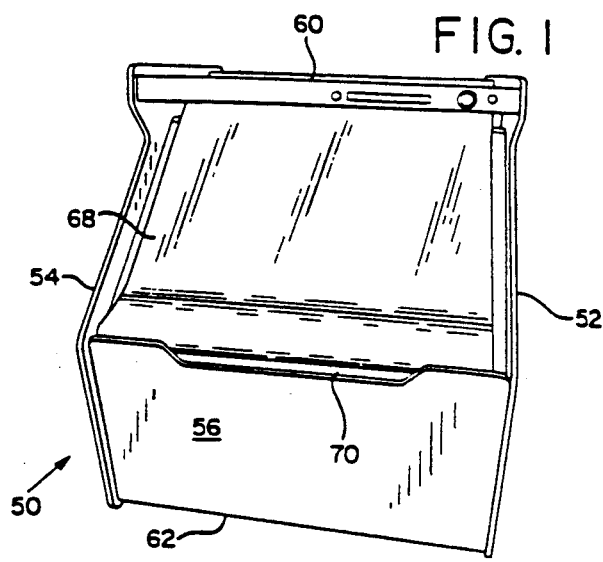
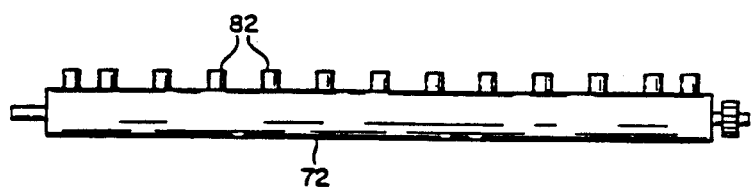
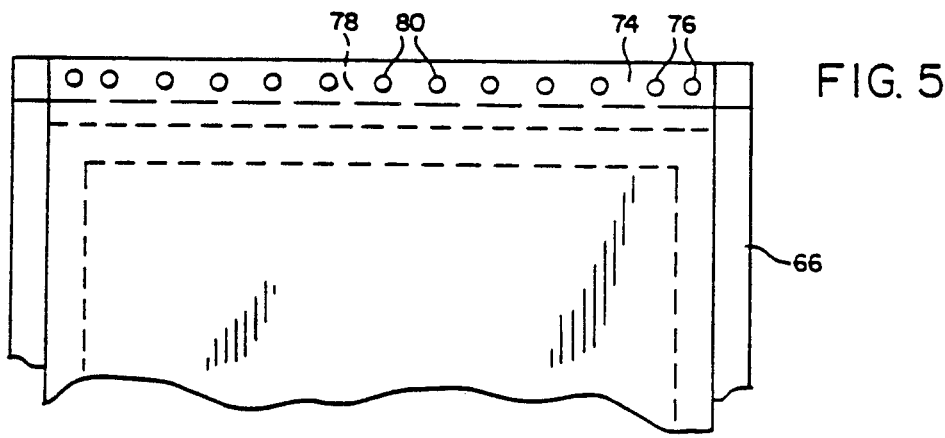
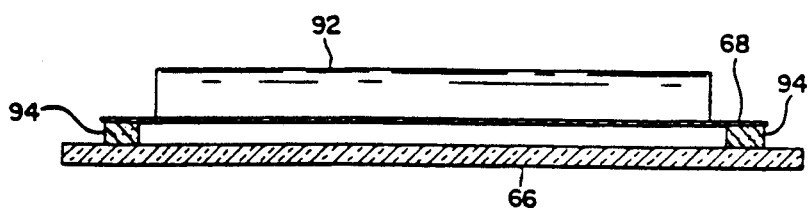
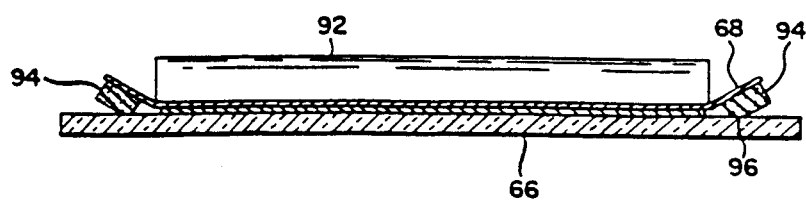

4,999,670

PRINTER WITH PRINT MEDIA SUPPORT SYSTEM

BACKGROUND OF THE INVENTION

This invention relates to an improved apparatus for exposing photosensitive media.

Known print-making devices include a rectangular glass plate with a light source on one side and a door or curtain on the other side. Means are provided for drawing a vacuum between the door or curtain and the glass plate. This vacuum is drawn after an original film to be copied ("a negative or positive") and an overlying sheet of material containing a photosensitive layer (e.g. diazo) are positioned on the glass plate. The vacuum flattens the sheets against the plate. A light source is turned on in order to expose the photosensitive layer. The exposed photosensitive sheet is thereafter developed.

In U.S. Pat Nos. 4,526,463 and 4,707,124, incorporated herein by reference in their entireties, a curtain is rolled across the sheets and plate with the vacuum being drawn as the curtain advances. Also, the plate, as shown in these patents, may be inclined with a roller mechanically pressing the curtain against the sheets and plate.

In such prior devices, the support structure for the glass plate has been found to be unsatisfactory. More particularly, because the underside of the glass plate is normally exposed to the light source, structural support for the glass plate is typically not provided within its interior portions. Support systems for such glass plates have provided support along each of the four edges of the glass plate. As a result of such a configuration, the glass plate sags in its middle portion. This sagging presents an area or gap wherein air can be trapped between the original film and sensitized media. Unless the media is drawn tightly against the glass plate, prints with blurred areas can be produced. Although these gaps can be eliminated by drawing a vacuum for a long period of time (i.e. five minutes or more), this slows down the print making process.

Therefore, an improved glass support apparatus is required to overcome these and other problems of the prior art.

SUMMARY OF THE INVENTION

An improved apparatus for exposing photosensitive media includes one or more of the following features, either alone or in cooperation with one or more of the other features.

(A) A print making apparatus with a sheet receiving plate which is supported only along all or portions of first and second opposed edges to minimize sag in a direction extending between the other opposed edges of the plate.

(B) A print making apparatus with a roller for mechanically pressing a curtain or other cover against the plate with the roller having an axis extending in a direction coincident with the direction along which sagging is minimized.

(C) A print making apparatus with an inclined sheet receiving plate supported only along its top and bottom edges.

(D) A print making apparatus having a sheet receiving plate with first and second opposed edges supported at locations spaced inwardly from unsupported third and fourth opposed edges of the plate.

(E) A print making apparatus having sheet supporting plate support at space locations along first and second opposed edges of the plate. For example, if the first and second edges are of a length X, these edges may be supported at locations spaced inwardly a distance which is approximately one-fourth X from their ends.

(F) A print making apparatus having a plate with first and second opposed edges and third and fourth opposed edges, the plate being supported at the first and second edges of the plate without supporting the central portion of the third and fourth edges of the plate.

(G) A print making apparatus having a plate with first and second opposed edges which are supported so as to elevate the central portion of the respective first and second edges relative to the end portions of the respective first and second edge.

(H) A print making apparatus having a plate which is elevated from an underlying peripheral support surface except during excessive loading of the plate.

(I) A print making apparatus having pads positioned between the peripheral surface and plate to elevate the first and second opposed edges of the plates off of the peripheral surface.

(J) A print making apparatus in which the plate is inclined and supported at its top and bottom edges, stops being provided to engage the bottom edge of the plate, and cushioning means being positioned between the edges of the plate and an adjacent peripheral surface of a body of the print making apparatus.

(K) A print making apparatus having a plate which is supported so as to be concave in cross-section in a first direction and generally straight in cross-section in a second direction normal to the first direction.

(L) A print making apparatus having a plate which is supported so as to be concave in cross-section in a first direction and being of an inverted recurve shape in cross-section in a second direction normal to the first direction.

It is accordingly one object of the invention to provide a print making apparatus with an improved plate suspension system.

It is another object of the invention to provide a print making apparatus which facilitates the rapid production of high quality prints.

These and other features, advantages and objects of the present invention will become apparent with reference to the description below.

BRIEF DESCRIPTION OF THE DRAWINGS

FIG. 1 is a front perspective view of an apparatus for exposing photosensitive media, with a curtain shown in the down position;

FIG. 2 is a side perspective view of the apparatus of FIG. 1, with the curtain shown partially down;

FIG. 4 is a side elevational view of the curtain drive shaft;

FIG. 5 is a top plan view of the upper portion of the curtain which is attached to a sheet supporting plate;

FIG. 6 is a front elevational view of the curtain of FIG. 3, shown in a rolled up position;

FIG. 7 is a front elevational view of the curtain of FIG. 3, shown in a partially unrolled position, and showing a sandwich of drawings positioned between the curtain and the plate;

DETAILED DESCRIPTION OF PREFERRED EMBODIMENT

With reference to the figures, an exemplary apparatus for directing light through one or more sheets of originals to a sheet of photosensitized media is shown. The sensitized media can be any type of photosensitive material such as diazo, silver film, or other print paper. The original contains information which is desired to be reproduced on the sensitized media. These originals can be paper, film, cloth, or other material through which light can pass. Such an apparatus is suitable for dot screen reproductions, as well as solid line reproductions.

Figure 9:
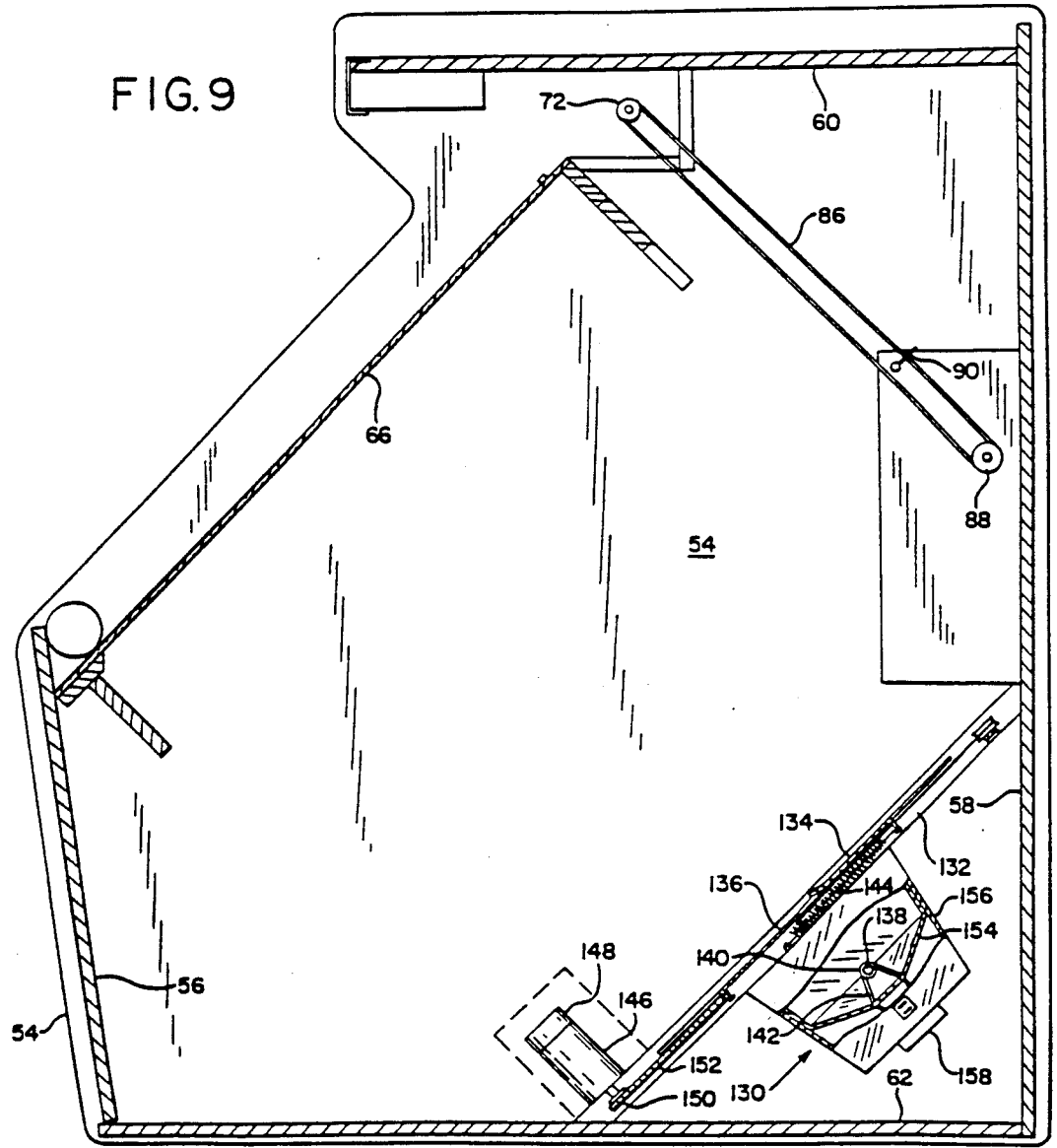
FIG. 9 is a vertical sectional view taken through the apparatus and showing one form of a suitable light shutter mechanism.

With reference to FIG. 1, the exemplary apparatus includes an enclosed housing or body 50 with sidewalls 52, 54, a front wall 56, and a back wall 58 (see FIG. 9). The housing also includes a bottom panel 62 (FIG. 9), and top panel 60 (FIG. 1).

A plate 66 of a transparent material, preferably glass, is supported by the housing 50. This plate can be positioned in a horizontal plane, a vertical plane, or in a plane at any angle therebetween. In the preferred embodiment, the plate is inclined as shown in FIGS. 1 and 2. The angle of incline is set at 45 degrees with respect to horizontal. Due to this incline, gravity tends to hold the sandwich of originals and sensitized media sheets against the glass plate. Also, the upper edge of the sandwich does not tend to peel away from the plate, which is the case as the angle is increased from 45 degrees on up to vertical. In addition, because of the incline, it is easy for the operator to reach the entire surface of the glass plate to position the sandwich on the plate prior to exposure. Also, it is easy to reach the top panel 60, which can then serve as a storage area.

Hinged lids or other covers can be utilized to overlie the sandwich after it is positioned on the plate. However, in the illustrated printer, a rolling flexible curtain 68 is utilized. This curtain is explained in detail below. As the curtain is unrolled, either automatically or manually, it presses the sandwiched sheets against the glass plate. The inclined plate aids the descent of the curtain. Also, because the curtain unrolls from the top, and the sandwich of sheets are typically fastened to the glass plate along their upper edges, the descending curtain tends to force air from underneath the sheets and flatten them. A jog plate 70 is provided at the bottom of the apparatus against which the sheets may be bounced to line up their edges.

With reference to FIGS. 3 through 7, one form of rolled curtain will now be described. Curtain 68 is of a flexible, durable material. Also, a vacuum is drawn between the curtain and glass plate to press the sheets flat against the plate. To permit this, the surface of the curtain adjacent to the plate is textured to permit air flow to and from this region as the vacuum is respectively relieved and drawn. A black, non-reflective material is most suitable to prevent undesired undercutting (that is, exposure of the photosensitive material underneath the lines of the original). An exemplary material is a truck seat vinyl of the type sold under the brand name NAUGAHYDE.

The curtain may be fastened to the plate in any suitable manner. For example, a clip 78 with pins 80 (FIG. 5) for insertion in holes 76 in the curtain may be used to hold the upper end of the curtain 74 on the glass. Also, the edge of the curtain may be clamped between a pair of clips (FIG. 3), which are fastened together and snap onto the glass plate.

As can be seen in FIG. 9, shaft 72 is driven by a motor 88 via a chain 86. A microswitch 90 contacts stops or triggers (not shown) on the chain to control the operation of motor 88.

A mechanism is provided to mechanically press the curtain against the plate and sheets. A variety of mechanisms, such as weights and brushes and other suitable devices, cam be used to press the curtain in place.

Figure 3:
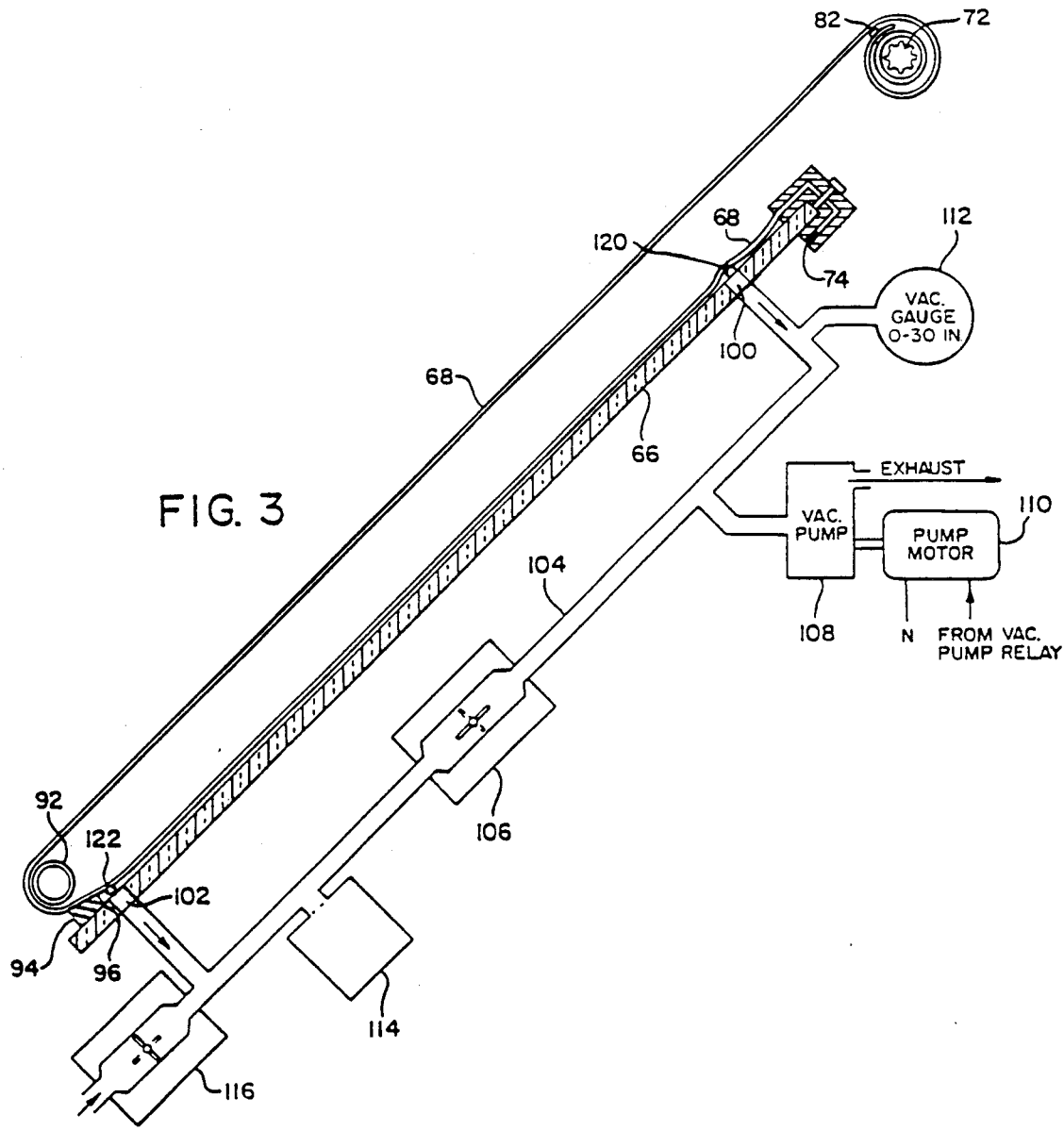
FIG. 3 is a side elevational view, partially in section, showing the curtain in the down position and the vacuum system of the apparatus.

As another specific example, referring to FIG. 3, a free-floating roller, such as roller 92, is positioned within the curtain loop to perform the pressing function. As the curtain unrolls, the roller travels down the inclined glass plate and presses the sandwich of sheets against the glass plate. In addition, because of the weight of this roller, it aids the curtain in its descent. Roller 92 has an axis which is parallel to the upper and lower opposed edges of the plate and which is normal to the opposed side edges of the plate.

One form of a system for sealing the curtain against the glass plate and drawing a vacuum will next be described. A seal is provided between the curtain 68 and glass plate 66. This seal, in the illustrated form, comprises a rectangular gasket 94 mounted to the undersurface of the curtain 68. The gasket may be of a durable resilient material, such as closed cell neoprene, and may be adhesively secured to the curtain. An exemplary material is the material utilized in common wetsuits.

As the roller 92 passes over the upper horizontal gasket portion, its lowermost corner 96 is compressed against the glass plate to enhance the seal. In addition, as can be seen in FIG. 6, the width of roller 92 is typically less than the transverse direction between the gasket portions at the sides of the curtain. Consequently, as the roller 92 travels down the glass plate, the side gasket portions 94 tip. As a result, their lower inner corners 96 are pressed against the glass plate, also enhancing the seal. As can be seen in FIG. 3, the roller 92 travels slightly past the upper edge of the bottom gasket portion. This also compresses corner 96 of the gasket against the glass plate, completing the seal.

Although not required, the illustrated vacuum system commences to draw a vacuum as the curtain descends. More specifically, as shown in FIG. 3, this vacuum system is provided with an upper port 100 and a lower port 102. A passageway 104 interconnects these ports and a normally closed solenoid valve 106 is positioned in this passageway. A vacuum pump 108 communicates with passageway 104 between the valve 106 and the upper port 100. A pump motor 110 drives the vacuum pump. A vacuum gauge 112 monitors the pressure at the upper port 100. In addition, an optional vacuum sensing safety switch 114 may be provided to sense the pressure in line 104 at a point between port 102 and solenoid valve 106 for purposes explained below. Furthermore, the system may include a normally open solenoid valve 116 communicating with the atmosphere. Valve 10 and valve 116 may be combined if desired. Also, valve 116 is optional.

In operation, as the curtain starts to descend, pump motor 110 is turned on and vacuum pump 108 commences to draw a vacuum between the curtain and glass plate via port 100. The valve 106 is closed at this time to prevent air from uncovered port 102 reaching the vacuum pump. When the curtain is in the down position, as is sensed by the microswitch 90 (FIG. 9), valve 106 opens so that a vacuum can be drawn at port 102 as well. Also, the valve 116 closes as the curtain descends. Typically, it is desirable to draw a vacuum in the range of 25 to 29 inches at sea level. At the time roller 92 reaches the bottom of its descent, a vacuum on the order of 22 inches at sea level has already been drawn. Thus, very little time is required to complete the drawing of the vacuum after the curtain reaches its down position. Also, as soon as the pressure reaches the desired negative level, as sensed at switch 114, the control circuit is activated to automatically commence exposure.

In addition, switch 114 acts as a safety switch. If an operator inadvertently lifts the curtain 68 during exposure of the sandwich, the rise in pressure is sensed. Switch 114 causes closing of the shutter doors to block the light source. This minimizes the risk of injury to an operator from the high intensity light. Thus, the control circuitry of the apparatus is such that the vacuum sensor controls the supply of light from a light source. Also a print is not ruined merely because someone inadvertently lifts the curtain. As soon as the cover is lowered and vacuum reestablished, the exposure cycle may be restarted at the point it left off and carried to completion without ruining the print.

Transverse air distribution means may be provided to prevent blockage of the ports 100, 102 by the curtain. These means facilitate the drawing and the relieving of the vacuum between the curtain and glass plate. Such means may comprise transverse wires 120, 122 mounted to the curtain so as to overlay the respective upper and lower ports 100, 102.

After an exposure is complete, and a delay of, for example, one second to allow for the shutter to close and the vacuum to bleed through valve 116, the valve 106 closes and the curtain 68 is automatically raised.

Figure 8:
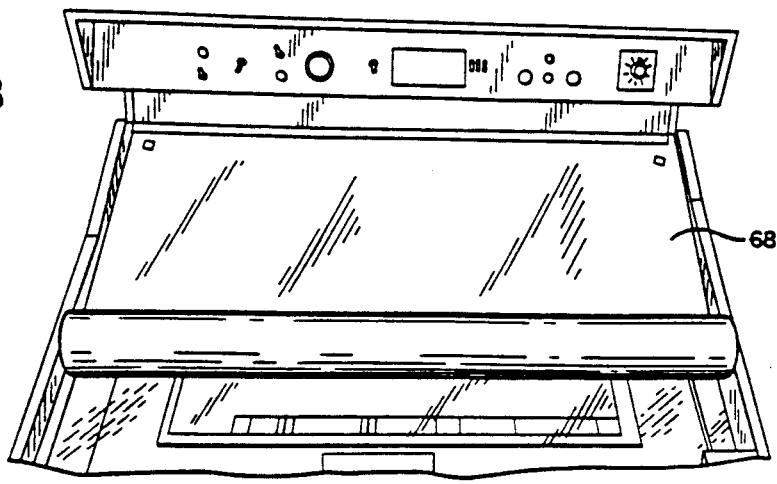
FIG. 8 is a front elevational view of a portion of the apparatus in accordance with the invention with another type of curtain.

FIG. 8 shows another form of rolling curtain in which the curtain does not comprise a loop, but is merely unrolled and rolled from a location at the upper end of the glass plate. The rolling and unrolling can be accomplished manually, or by a cable drive system, operable in much the same manner as the drive system described in connection with FIG. 3.

Any suitable light source and shutter may be utilized, including a relatively high speed shutter. One form of a shutter apparatus 130 (FIG. 9) is mounted by a framework 132 between the back panel 58 and floor 62 of the apparatus. The shutter has doors 134, 136 positioned in a 45 degree plane so that they are parallel to glass plate 66. This results in a more even exposure of the sandwich when upper and lower shutter doors 134, 136 are opened. A lamp, such as a metal halide lamp 138, is positioned behind the shutter doors. The lamp is held in a ceramic retainer 140 which in turn is retained in place by a retaining spring 142. Shutter door closing springs 144 (one being shown in FIG. 10) are provided for closing the doors 134, 136. The doors are opened at desired times by a reversible shutter drive motor 146 coupled by a sprocket 150 and chain 152 to the doors. Motor 146 is provided with a brake 148 to lock the motor and doors in an open position for the desired exposure time in response to a control circuit. (See for example, U.S. Pat. Nos. 4,707,124 and 4,526,463.) A reflector 154 directs light from the lamp toward the sandwich when the doors 134, 136 are opened. A cooling housing 156 surrounds the reflector 154. A lamp cooling fan 158 can be turned on by a control circuit at desired times to cool the lamp.

Figure 10:
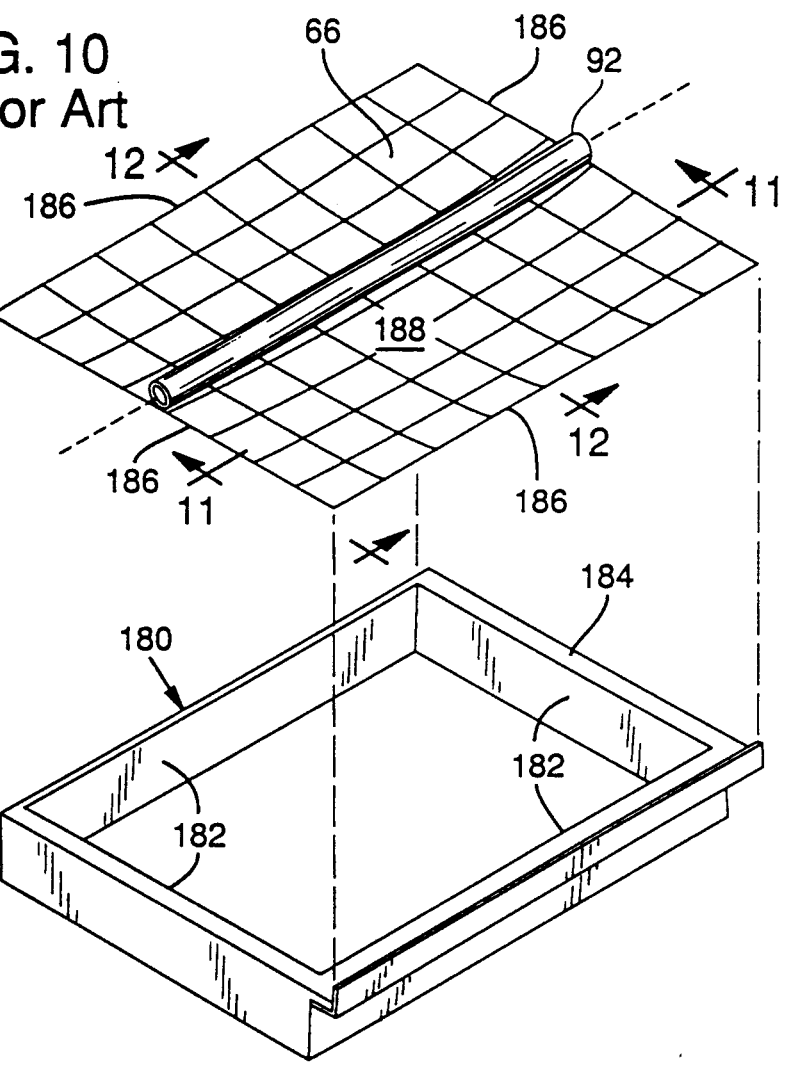
FIGS. 10–12 illustrate a prior art support system for a sheet receiving plate of the apparatus of FIG. 1.
Figure 11:
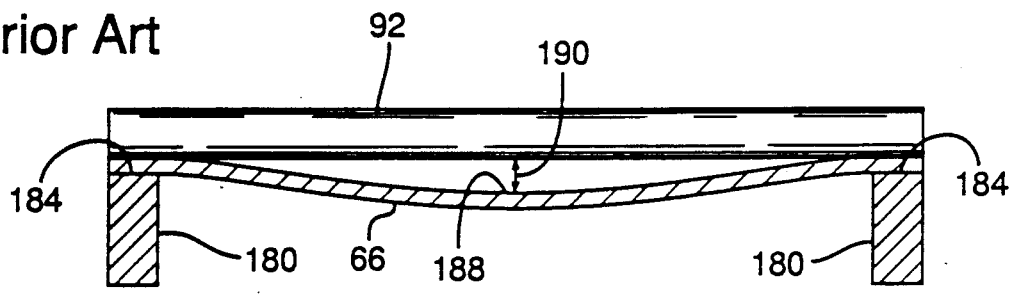
Figure 12:
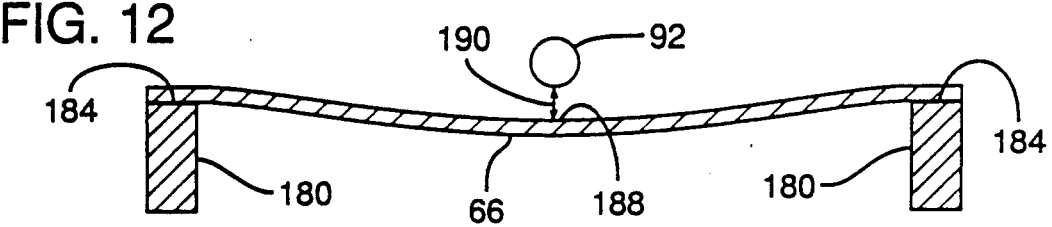

With the above general description in mind, the following discussion will focus on the subject matter of the present invention. FIGS. 10-12 illustrate a prior art support system for the glass plate 66. In FIGS. 10-12, only the support system for glass plate 66 and roller 92 are shown for purposes of illustrating the cooperative relationship between these elements. The curtain 68 or other cover means is omitted. However, it is to be understood that, in the embodiment shown in FIGS. 10-20, curtain 86 loops around roller 92 and operates in the fashion described above. Furthermore, in the FIGS. 10-20, glass plate 66 is shown with contour lines to illustrate the contour of glass plate 66 as it rests upon its support system. It is to be understood that glass plate 66 is preferably a transparent plate as previously described. Thus, the contour lines are included in these drawings for purposes of illustration only. The prior art FIG. 10 glass plate support system 180 has inherent disadvantages. In this construction, the support system 180 is a rectangular frame having dimensions generally matching those of glass plate 66. Structural elements 182 are interconnected in this system to form a rectangle with upwardly facing edge surfaces 184. The surfaces 84 underlie and contact the entire periphery of glass plate 66 to support the plate. When the glass plate 66 is supported in this manner, the center portion 188 of glass plate 66 sags relative to a plane containing the edges 186 of the glass plate. That is, the plate 66 is concave. As a specific example, for a plate of tempered glass of $43\frac{1}{2}'\times 53\ 9/16'\times\frac{1}{4}'$, the center will sag about 60 mils when supported in this manner. FIGS. 11-12 show sectional views of glass plate 66 and support system 180. In FIG. 11, roller 92 is viewed transversely. In FIG. 12, roller 92 is viewed longitudinally. In both FIGS. 11 and 12 it is seen that a gap 190 exists between roller 92 and the central portion 188 of glass plate 66. The gap 190 tends to trap air between the sensitized layer and the original prints. Such a gap degrades the quality of the final print in that small blurred areas can result due to the trapped air. One method of eliminating the gap is to subject the area between the curtain and plate with a vacuum for a sufficient time to remove the air and flatten the sheets against the plate in the region of the gap. This approach is undesirable because satisfactory evacuation of the air can take 5 to 10 minutes or more. This is too long to wait for a print to be made.

Figure 13:
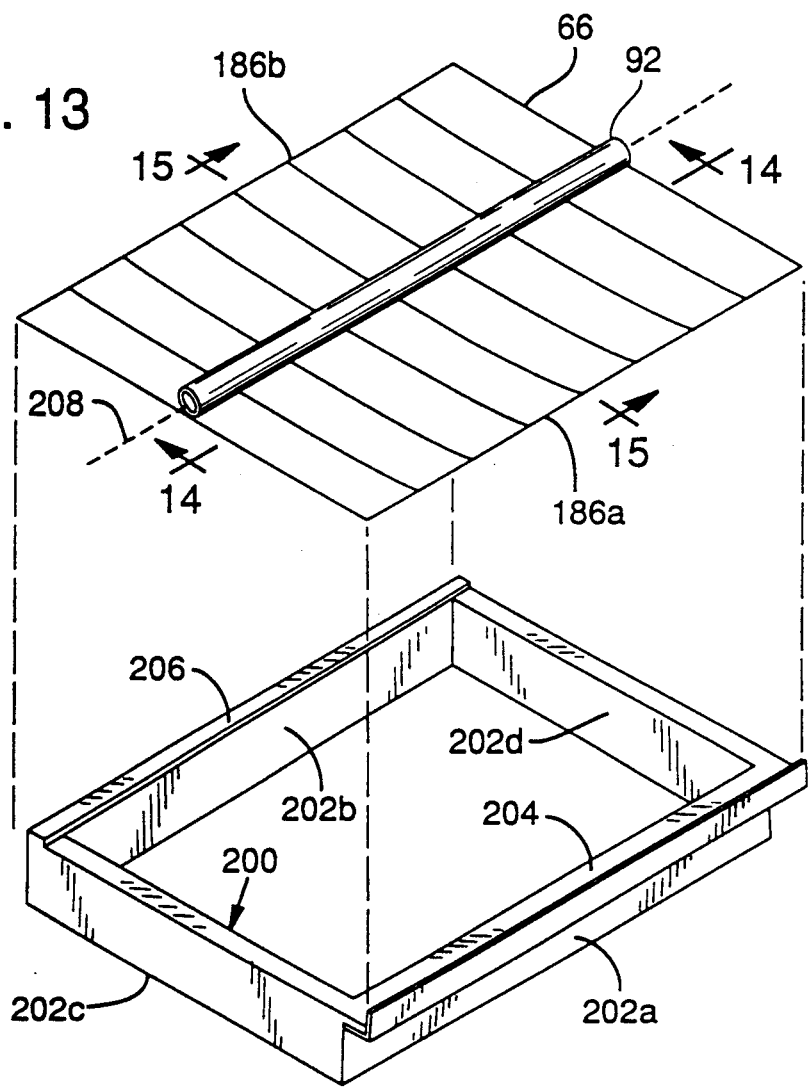
FIGS. 13–15 illustrate one embodiment of the present invention.
Figure 14:
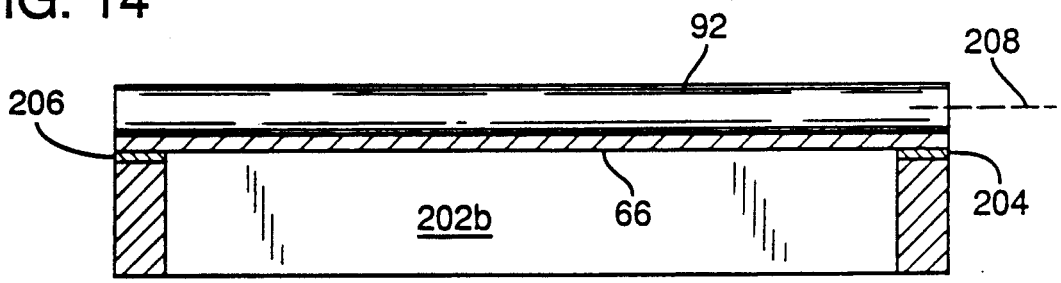
Figure 15:
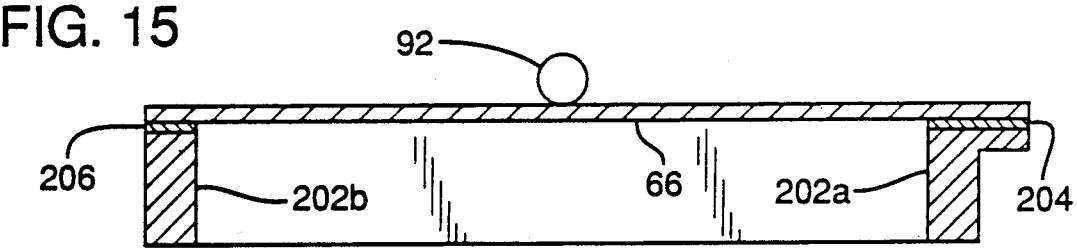

In the support system of FIG. 13, the glass plate 66 is supported only at upper edge 186b and lower edge 186a. The illustrated support system 200 includes structural elements 202a, 202b, 202c and 202d interconnected to form a rectangular frame similar to the rectangular frame 180 of FIG. 10. A first support pad 204 lies substantially along the entire length of the upward facing edge of support element 202a. A second support pad 206 lies along the entire length of upward facing edge of support element 202b. As glass plate 66 rests upon support 200, edge 186a of glass plate 66 contacts pad 204. Similarly, edge 186b of glass plate 66 contacts support pad 206. In this manner glass plate 66 is supported only at its upper edge 186b and lower edge 186a. When supported in this manner, in cross-section in a first direction between the supported edges, the glass plate sags as shown in FIG. 15. However, in a second direction normal to the first direction, the glass plate is substantially straight in cross-section as shown in FIG. 14. Because the edges 186a and 186b of glass plate 66 are parallel to the longitudinal and rotational axis 208 of roller 92, roller 92 remains in substantial engagement with glass plate 66 as roller 92 moves from edge 186b to edge 186a of glass plate 66. Therefore, the gap 190 of FIG. 10 is substantially eliminated by the FIG. 13 support system.

FIGS. 14 and 15 thereby further illustrate the relationship between roller 92 and glass plate 66 in the embodiment of FIG. 13. In FIG. 14, it is seen that the entire length of roller 92 remains in engagement with glass plate 66. Thus, as roller 92 moves across glass plate 66 and a vacuum is applied to withdraw air from between the glass plate 66 and the sensitized sheet, no gap remains between the sensitized layer, originals, and the glass plate 66. In FIG. 15, it is seen that glass plate 66 does sag. However, the glass plate 66 only sags in a transverse direction with respect to roller 92. Therefore, roller 92 remains in substantial engagement with glass plate 66. These figures also illustrate how the supported edges are elevated relative to the central portion of the unsupported edges. By supporting the plate 66 along a major portion of the top and bottom edges, the results of FIG. 13 are still substantially achieved even though the plate is not supported along substantially the entire top and bottom edges of the plate. It should also be noted that the same results are observed when the plate 66 is inclined.

Figure 16:
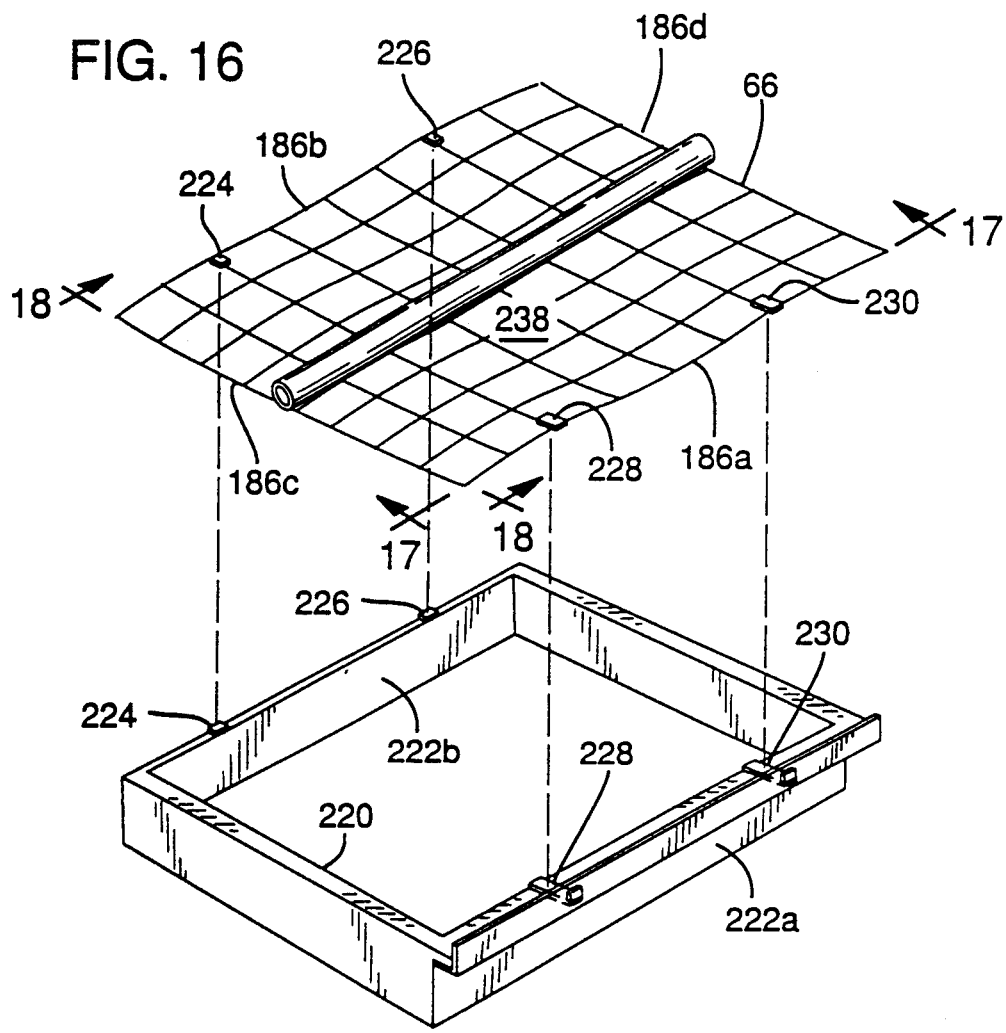
FIGS. 16–20 illustrate another embodiment of the present invention.

FIG. 16 illustrates another embodiment of the present invention. In FIG. 16, support 220 is a rectangular frame having substantially identical dimensions to that of glass plate 66. In the embodiment of FIG. 16, glass plate 66 is supported at four points. Pad assemblies 224 and 226 are interposed between structural element 222b and the upper edge 186b of glass plate 66. Pad assemblies 228 and 230 are interposed between the lower edge 186a of glass plate 66 and the structural element 222a. Each of pad assemblies 224, 226, 228 and 230 provide a support point for glass plate 66. Structural details of pad assemblies 224, 226, 228 and 230 will be discussed hereinafter.

Figure 17:
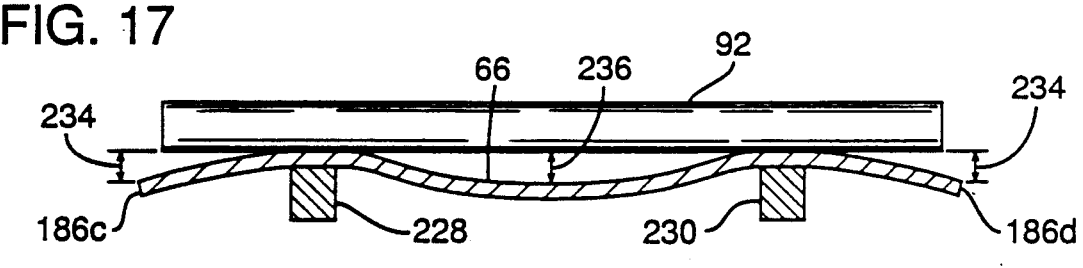
Figure 18:
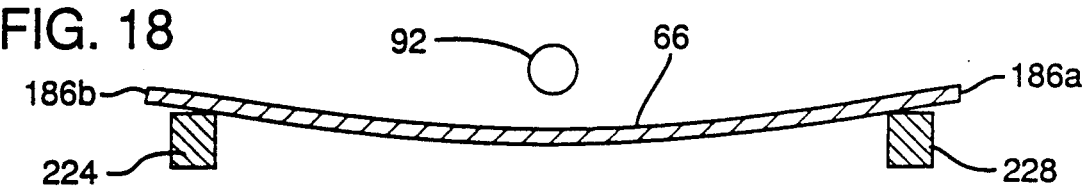

FIGS. 17 and 18 illustrate edge views of glass plate 66 when supported by pad assemblies 224-230. In FIG. 17, it is seen that minor gaps 234 exist at the edges 186c and 186d of glass plate 66. Also, a gap 236 exists in the center portion 238 of glass plate 66. Although such gaps exist (and are exaggerated in this figure) between roller 92 and glass plate 66, the gaps between roller 92 and glass plate 66, when supported by pad assemblies 224-230, are much less than the gaps present when glass plate 66 is supported along all four edges as shown in FIGS. 10-12. In FIG. 18 it is seen that the FIG. 16 support system results in a glass plate which sags in the transverse direction relative to roller 92. With the illustrated sagging, the roller 92 maintains substantial engagement with glass plate 66 as roller 92 travels from edge 186b toward edge 186a.

The support system of FIG. 16 generally supports glass plate 66 along the top edge 186b and the bottom edge 186a in a similar fashion to the support provided by the embodiment of FIG. 13. However, the embodiment of FIG. 16 does not support glass plate 66 substantially along the entire length of edges 186a and 186b. Therefore, problems of manufacturing a long glass supporting edge to required tolerances are eliminated. Pad assemblies 224-230 are preferably placed along the length of glass plate 66 at locations inwardly from the side edges of the plate. Also, it is desirable to balance the material of glass plate 66 which is positioned on opposite sides of the pad assemblies 224-230. More particularly, consider the positioning of pad assembly 224 and pad assembly 228 relative to edge 186c and the positioning of pad assembly 226 and pad assembly 230 relative to edge 186d. Pad assemblies 226 and 230 are positioned inwardly from edge 186c approximately one-fourth the distance or length X of edge 186a. Similarly, pad assembly 224 and pad assembly 228 are each positioned approximately one-fourth the distance along edge 186a from the edge 186c. In this manner pad assemblies 224 and 228 balance the left half, as viewed in FIG. 16, of glass plate 66 while pad assemblies 226 and 230 balance the right half of glass plate 66. As a result of such balancing, gaps between roller 92 and glass plate 66 are minimized.

Gaps between roller 92 and glass plate 66 may be controllably adjusted by positioning pad assemblies 224-230. If gaps 234 are to be minimized, pad assemblies 228 and 224 and moved closer to edge 186c of glass plate 66 and pad assemblies 226 and 230 are moved closer to edge 186d of glass plate 66. If gap 236 is to be minimized, pad assemblies 228 and 224 are moved closer to the center of glass plate 66 said pad assemblies 226 and 230 are moved toward the center of edges 186a and 186b. A crown may be provided at the center of glass plate 66 if pad assemblies 224-230 are moved close enough to the center of glass plate 66.

With the FIG. 16 construction, the glass plate will flex to conform to the curtain and supported sheets as the roller advances over the glass plate.

Figure 19:
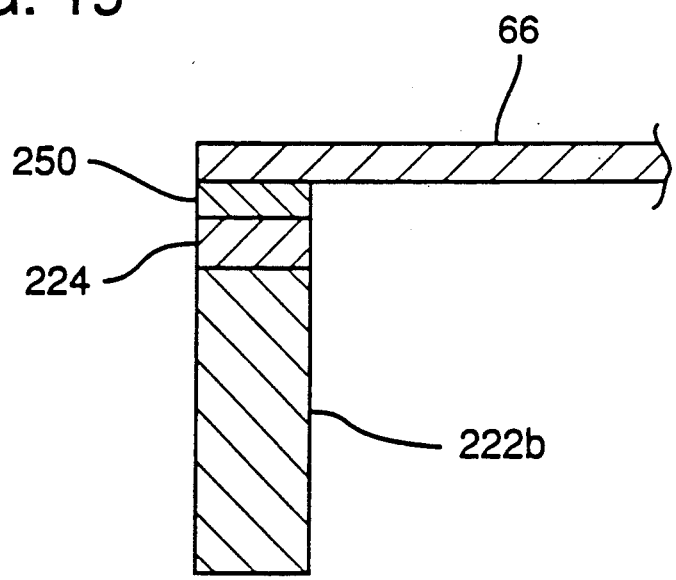

The pads 224, 226, 228, 230 may be of any suitable material, with ⅛' thick masonite strips being one specific example. As shown in FIG. 19, a foam strip 250 is typically placed over the pads and on top of the peripheral frame surface which underlies the edges of the glass plate (this strip has been omitted from the other figures). The glass plate typically is spaced or floats above the peripheral surface of the frame, for example, by about 1/16 of an inch. When the glass is loaded excessively, the edges of the glass engage the peripheral surface of the frame to fully support the edges of the glass under these conditions.

Figure 20:
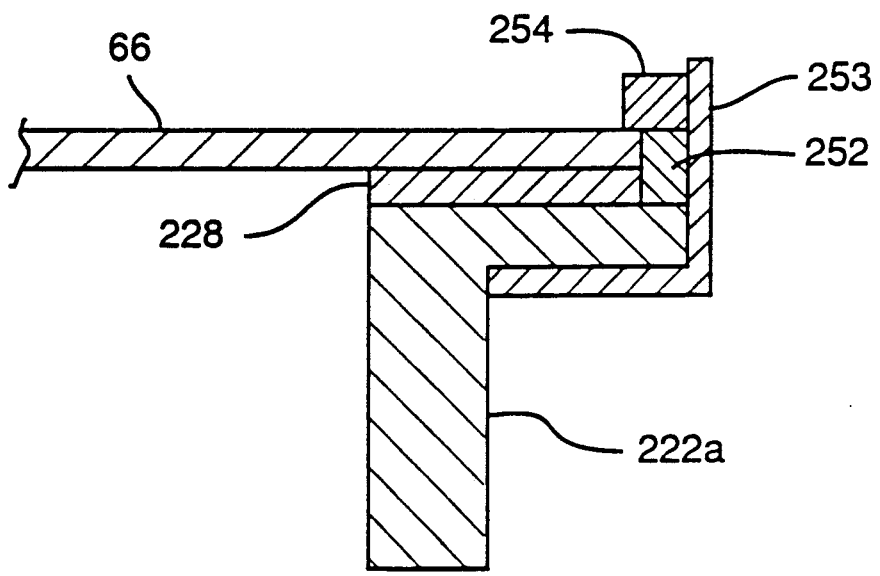

As shown in FIG. 20, stops (one being shown at 252), such as hard rubber, space the edge of the glass plate from the frame component 253. Therefore, the frame does not interfere with the flexing of the glass plate. Also a foam strip 254 seals the gap between the glass plate and frame component 253 to prevent the edges of sheets (not shown) from catching in this gap.

Having illustrated and described the principles of my invention with reference to one preferred embodiment, it should be apparent to those persons skilled in the art that such invention may be modified in arrangement and detail without departing from such principals. I claim as my invention all such modifications as come within the true spirit and scope of the following claims.

I claim:

1. A print making apparatus having a plate with first and second opposed edges and third and fourth opposed edges, the plate comprising means for supporting one or more original sheets and a sheet of photosensitive media, means for supporting the plate in position to receive the sheets, cover means for movement between a first position off of the sheets and a second position covering the sheets, means for drawing air from between the cover means and sheets as the cover means is moved between the first and second positions, means for mechanically pressing the cover means against the sheets and plate as the cover means is moved between the first and second positions, and the means for supporting the plate comprises means for supporting the plate only along the first and second opposed edges, whereby sagging of the plate along lines extending between the third and fourth opposed edges is reduced.

2. An apparatus according to claim 1 in which the means for mechanically pressing the cover sheet comprises a roller having a longitudinal axis extending along a line coincident with the direction between the third and fourth opposed edges, the roller comprising means for engaging the cover means and pressing the cover means against the sheets and plate.

3. An apparatus according to claim 2 in which the plate is inclined.

4. An apparatus according to claim 1 in which the means for supporting the plate comprises means for supporting the first opposed edge at at least one location spaced inwardly along the first edge from the third and fourth edges and for supporting the second opposed edge at at least on location spaced inwardly along the second edge from the third and fourth edges.

5. An apparatus according to claim 4 in which the first and second edges are each supported along a major portion of their length.

6. An apparatus according to claim 4 in which the first and second edges are each supported at first and second spaced locations along the respective edges.

7. An apparatus according to claim 6 in which the first and second edges have a length X, the first and second spaced locations being approximately one-fourth X from the third and fourth edges.

8. An apparatus according to claim 1 in which the means for supporting the plate comprises means for supporting substantially the entire first and second edges of the plate.

9. An apparatus according to claim 8 in which the plate is inclined and the first and second edges comprise the upper and lower edges of the plate.

10. An apparatus according to claim 4 in which the plate is inclined and the first and second edges comprise the upper and lower edges of the plate.

11. In a print making apparatus having a plate with first and second opposed edges and third and fourth opposed edges, the plate also having top and bottom surfaces, the plate comprising means for supporting one or more original sheets and a sheet of photosensitive media, means for loosely supporting at least a portion of the bottom surface of each of the plates at the first and second edges of the plate without supporting the central portions of the third and fourth edges of the plate.

12. In a print making apparatus having a plate with first and second opposed edges and third and fourth opposed edges, the plate also having upper and lower surfaces, the plate comprising means for supporting one or more original sheets and a sheet of photosensitive media, means for loosely supporting the lower surface of first and second edges of the plate without supporting the central portions of the third and fourth edges of the plate, and in which the means for supporting the plate comprises means for elevating the central portion of the first and second edges of the plate relative to end portions of the first and second edges of the plate.

13. In a print making apparatus having a plate with first and second opposed edges and third and fourth opposed edges, the plate also having upper and lower surfaces, the plate comprising means for supporting one or more original sheets and a sheet of photosensitive media, means for loosely supporting the lower surface of first and second edges of the plate without supporting the central portions of the third and fourth edges of the plate, and in which the means for supporting the plate comprises a plate supporting frame which has a peripheral surface which underlies the first, second, third and fourth edges of the plate, the means for supporting the plate comprises elevating means for elevating portions of the first and second surfaces relative to the underlying peripheral surface such that the first, second, third and fourth edges of the plate are spaced from the peripheral surface except during excessive loading of the plate.

14. An apparatus according to claim 13 in which the elevating means comprises at least one pad disposed between the peripheral surface and the first edge and at least one pad disposed between the peripheral surface and the second edge.

15. An apparatus according to claim 14 in which the elevating means comprises the first set of at least two spaced apart pads disposed between the peripheral surface and the first edge and a second set of at least two spaced apart pads disposed between the peripheral surface and the second edge.

16. An apparatus according to claim 15 in which the pads of the first set are spaced inwardly from the third and fourth edges and the pads of the second set are spaced inwardly from the third and fourth edges.

17. An apparatus according to claim 16 in which the first and second edges are of a length X, their being two pads in each of the first and second sets, one of the pads of the first set being positioned a distance of approximately one-fourth X from the third edge, the other of the pads of the first set being positioned approximately one-fourth X from the fourth edge, one of the pads of the second set being positioned a distance of approximately one-fourth X from the third edge, the other of the pads of the second set being positioned approximately one-fourth X from the fourth edge.

18. An apparatus according to claim 17 in which the plates is inclined with the first edge comprising an upper edge of the plate and the second edge comprising a lower edge of the plate, the apparatus including stop means for engaging the second edge of the plate and cushioning means between the peripheral surface and pads and the edges of the plate.

19. In a print making apparatus having a body, a plate comprising means for supporting one or more original sheets and at least one sheet of photosensitized media, and means for supporting the plate on the body with the plate in cross-section in a first direction being concave, and the plate in cross-section in a second direction normal to the first direction being substantially straight.

20. In a print making apparatus having a body, a plate comprising means for supporting one or more original sheets and at least one sheet of photosensitized media, and means for supporting the plate on the body with the plate in cross-section in a first direction being concave and the plate in cross-section in a second direction normal to the first direction being of an inverted recurved shape.

* * * * *